United States Patent [19]

van de Kamp

[11] Patent Number: 4,500,578

[45] Date of Patent: Feb. 19, 1985

[54] ENDLESS LOOP ARTICLES OF MANUFACTURE, STRAPS SHAPED THEREFROM, AND MATS MADE FROM SUCH STRAPS

[75] Inventor: Dieter van de Kamp, Bad Pyrmont, Fed. Rep. of Germany

[73] Assignee: Spanset Inter AG, Basel, Switzerland

[21] Appl. No.: 581,900

[22] Filed: Feb. 21, 1984

[30] Foreign Application Priority Data

Feb. 22, 1983 [DE] Fed. Rep. of Germany ... 8304806[U]

[51] Int. Cl.[3] .................... B32B 7/00

[52] U.S. Cl. .................... 428/36; 428/72; 428/74; 428/76; 428/102; 428/131; 428/178; 428/192; 428/193; 428/225; 428/257

[58] Field of Search .................... 428/36, 64, 65, 66, 428/68, 72, 74, 76, 102, 131, 178, 192, 193, 222, 225, 257

[56] References Cited

U.S. PATENT DOCUMENTS

| | | | |
|---|---|---|---|
| 4,202,381 | 5/1980 | Bucher | 139/383 R |
| 4,209,044 | 6/1980 | Taki | 428/245 |
| 4,289,820 | 9/1981 | Blessing | 428/245 |

*Primary Examiner*—James J. Bell

*Attorney, Agent, or Firm*—Spencer & Frank

[57] ABSTRACT

An endless loop article of manufacture comprises a core consisting essentially of at least one skein and a protective covering consisting essentially of hose fabric loosely enclosing said core, and a warp threading and a weft threading which latter comprises at least one monofilament thread extending transverse to the central loop axis, and preferably a monofilament and a multifilament thread arranged to run side by side. The protective covering comprises an endless toroidal part and an internal annular selvedge flange extending radially inwardly from the latter.

A strap can be formed from such article of manufacture so deformed that opposite segments of the internal selvedge flange are brought into contact and sewn together, e.g. with an auxiliary warp thread, or by superimposing a protective layer to which the segments are sewn.

The protective covering of the article can further comprise an external circumferential selvedge flange projecting radially outwardly from the toroidal part. From this kind of straps a mat can be formed by conventional methods.

23 Claims, 12 Drawing Figures

Fig. 1
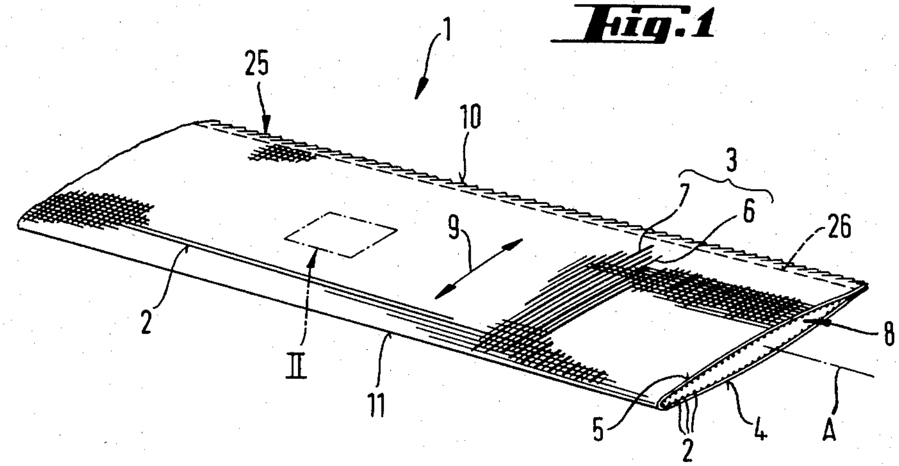
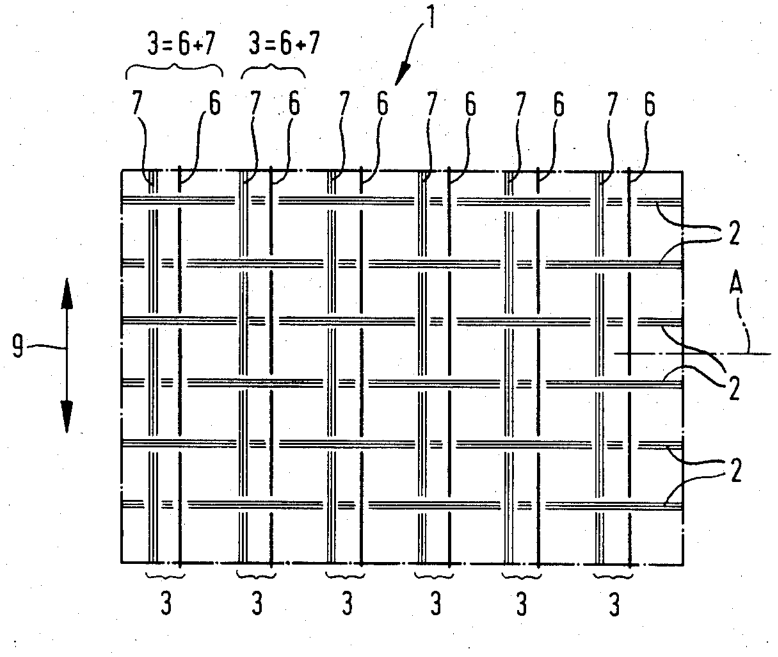
Fig. 2

Fig. 7
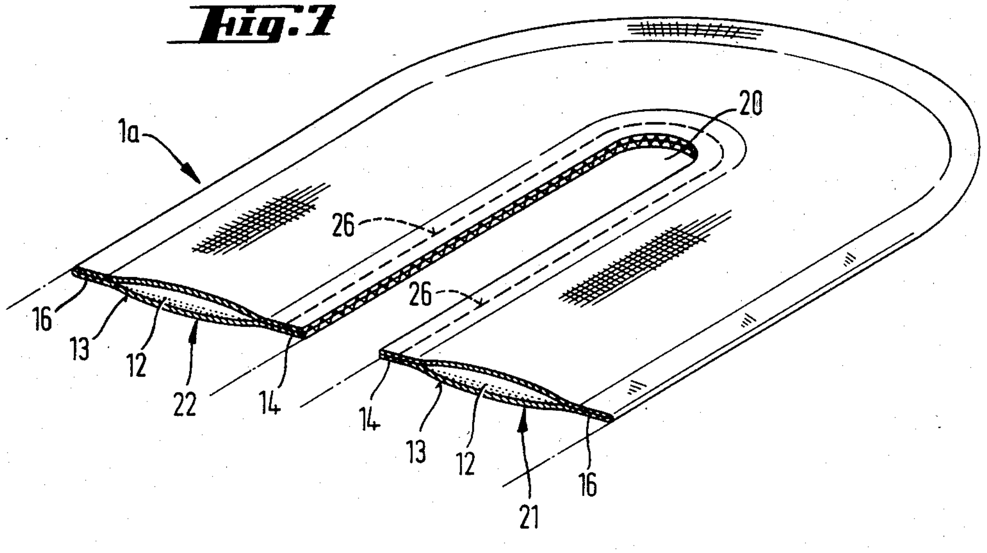
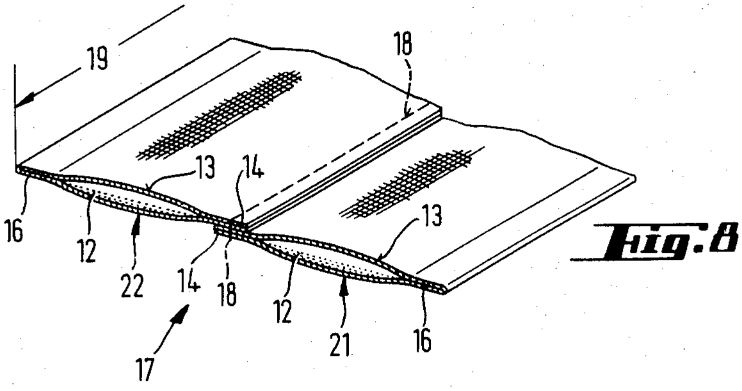
Fig. 8
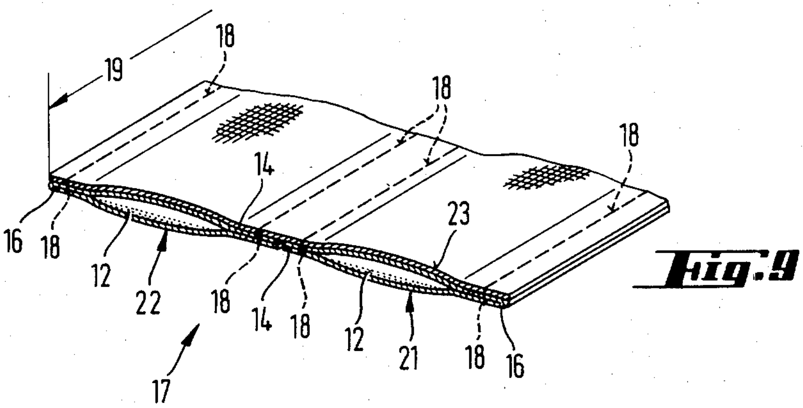
Fig. 9

Fig. 10
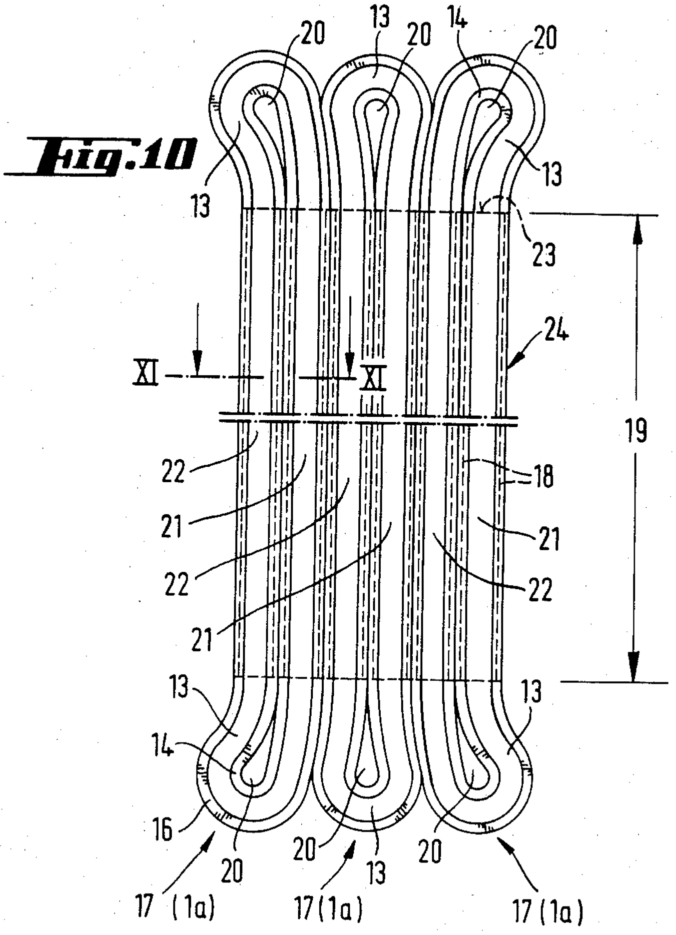
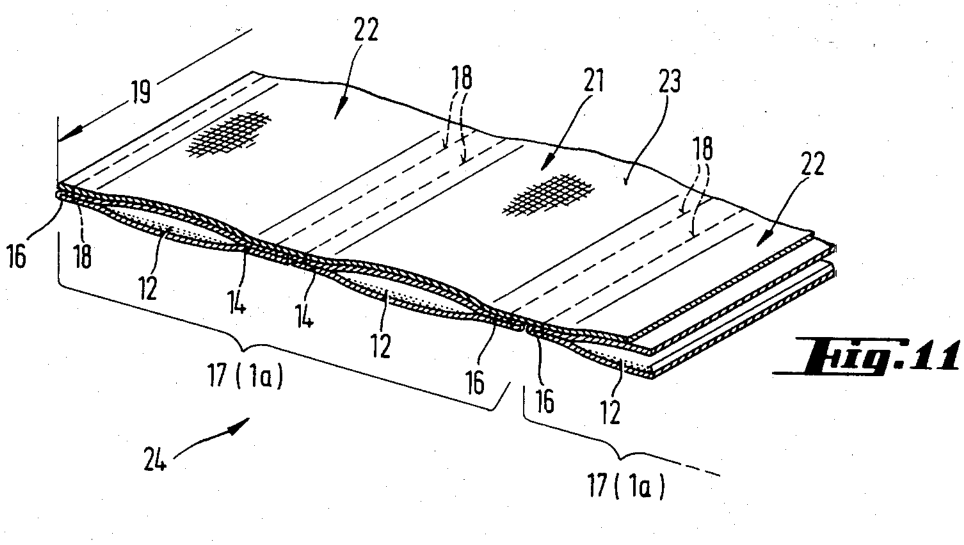
Fig. 11

ENDLESS LOOP ARTICLES OF MANUFACTURE, STRAPS SHAPED THEREFROM, AND MATS MADE FROM SUCH STRAPS

BACKGROUND OF THE INVENTION

This invention relates to an endless loop, being a flat toroidal article of manufacture, comprising a core consisting essentially of at least one skein, and a protective substantially toroidally shaped covering consisting essentially of hose fabric, having a central loop axis longitudinally extending therein, and loosely surrounding the core. The hose fabric has, as usual, a warp threading and a weft threading.

Such endless loops or torus-like bodies have been described, for instance, in German Offenlegungsschrift (published patent application) No. 2,129,837, in Canadian Pat. No. 953,882 and in European patent application No. 0032749.

It is a feature of such known torus-shaped bodies that the skein constituting the core in the body fills the cross sectional area of the toroidal covering hose only by about 50 to 70%, whereby the core remains freely displaceable in the interior of the annular body in longitudinal direction as well as transverse thereto. The individual windings of the core are not fixed in relation to the protective annular hose or with regard to each other. The individual turns of the skein can, therefore, move relative to one another when under load and thereby attain, due to the load, equal lengths, so that an overloading of an individual thread winding is avoided. The protective annular body is manufactured as a hose fabric or tissue. Technically, a textile hose fabric is a two-layer fabric consisting of an upper fabric and a lower fabric, wherein the mutual connection between the upper and the lower fabric is only present at the longitudinal marginal edges, whereby a hollow hose interior is formed between the two opposite marginal edges. Being manufactured in this manner, the finished protective hose has the aspect of a strip or band-shaped body.

The manufacture of the initially described endless loop or torus-shaped body disclosed in German Offenlegungsschrift No. 2,129,837 and Canadian Pat. No. 953,882 has been described more in detail in European patent application Publication No. 0032,749 which description is hereby incorporated by reference.

After manufacturing the finished torus-shaped endless loop article, which is achieved by introducing the skein constituting the loop core into the protective toroidal covering, the latter assumes a somewhat slightly inflated configuration as compared with the original flat belt-shape, and then has a cross sectional contour which can be described as a flat oval. One of the two ends of the protective covering is then inserted into the other, and the two ends are then connected with each other preferably by sewing them together. Even after this step, the protective covering is of somewhat greater length, about the entire circumference of the endless loop covering, than the core constituted by the skein. This excess of length of the protective covering above the length of the core serves to guarantee that, when under load, that load will be absorbed exclusively by the core, i.e. by the skein, so that the protective covering is not subjected to any tensile stress. This ensures that, in the loaded article, the protective covering, being under no tensile stress, therefore will not tear; tearing would cause it to lose its protective and enveloping functions with regard to the core. This excess of length causes, in particular on the side of the protective covering facing toward the load, a slight folding of the covering which undesirably affects the handling of the article, and renders a further processing thereof, more difficult; it also causes a greater wear of the protective covering in the region where these folds are formed.

OBJECTS AND SUMMARY OF THE INVENTION

It is therefore a principal object of the invention to provide an endless loop being a flat toroidal article of the initially described type which is free from the above-mentioned drawbacks and is easy to handle and of improved resistance to wear.

This object is attained, in accordance with the invention, in a flat toroidal article of the initially described kind in which the weft threading of the hose fabric comprises at least one monofilament thread ("monofil") extending transverse to the initially-mentioned central tube or hose axis.

The feature of the weft thread, or at least one weft thread, of the hose fabric being constituted by a monofilament thread affords a noticeable increase of the transverse stiffness (stability of shape) of the hose fabric. The presence of the monofilament, or "monofil", has the effect of a textile wire reinforcement which permanently strives to keep the two marginal edges, on opposite sides of the hose, apart from each other, and to move the upper fabric and the lower fabric of the protective hose as close as possible into contact with each other and with the skein therebetween. Thereby, in unstressed condition, the flat toroidal article or endless loop according to the invention is given the aspect of a flat band or belt. This feature also causes the skein, i.e. the supporting core of the torus-like article to be oriented in a flat configuration, engaging the load or a load-carrying hook as a flat strip or belt. Thereby, the tendency of the protective covering of the flat toroidal article to form folds, in particular in the surface of the protective covering facing toward the load, is considerably reduced and, consequently its tendency to wear in the folded region is diminished.

Finally, the suppression of fold-formation of the protective covering, as a result of the inventive feature in the flat toroidal endless loop facilitates withdrawal of the latter from the load, after the load has been deposited in a desired location, for instance on a supporting surface. In the case of hitherto used endless loops, the fold formation in the protective hose on the side of pull may lead to a wedging effect which makes removal of the endless loop from the deposited load more difficult.

Due to its above-described inventive feature, the protective covering will always snap back into its broad and flat band-like initial shape. The increase in stiffness procured by this kind of textile wire reinforcement also simplifies pushing the endless loop across the underside of a load. Finally, the lesser susceptibility of a monofilament thread to cutting (shear resistance) as compared with that of a multifilament thread is of advantage, as it leads to longer life of the protective covering.

According to another, preferred feature of the invention, the weft threading in the hose fabric constituting the protective covering comprises, besides the monofilament thread, a multifilament thread, both the monofilament thread and the multifilament thread running side by side in the fabric, and preferably parallel with one another. "Monofil" threads have a very smooth surface. In a hose fabric in which the weft threads are exclusively constituted by monofilament threads, the warp threads could easily be displaced on the smooth weft threads, whereby opening of the fabric could easily occur. This easy displaceability of the warp threads on the smooth weft threads is avoided by the additional insertion of a multifilament weft thread which does not have this drawback of an excessively smooth surface and thereby decreases the danger of easy opening of the fabric.

Weaving of the protective covering using alternatively a monofilament weft thread and a multifilament weft thread can be easily achieved by double weft thread insertion, which is possible in the case of modern automatic needle looms. Due to their appropriate modulus of extension, polyester monofilaments are particularly suited as monofilament weft threads. The tying of end connections of the weft threads in the region of at least one selvedge of the protective covering, either by providing a knitted thread loop at the end connection, or by providing at least one auxiliary thread, and tying the weft threads, or the inserted weft threading, with the auxiliary thread, or by providing a knitted-in securing thread by means of which the weft threads or the end portions of the inserted weft threading are tied, has the effect of avoiding that the protective covering could be torn open and/or unravelled when it happens to become damaged in the region of its woven edge. This tying of the weft thread loops is advantageously carried out in the manner described by Robert R. Bucher in U.S. Pat. No. 4,202,381 being the equivalent of German patent application No. 2,637,618, the contents of which are made part hereof.

The use of a monofilament weft thread for manufacturing a protective covering, as the principal feature of the instant invention, is of particular advantage in the case of flat, toroidal articles of manufacture in the form of endless loops as they have been described in European patent application No. 0032749, supra.

The protective covering in the article of manufacture according to the invention comprises a toroidal part having a central loop axis extending through the tubular interior of the torus and in a central plane along which the protective covering extends when in flat, undeformed state. An internal annular selvedge flange extends in the said central plane and projects radially inwardly from the toroidal part about the torus opening. A half portion of the toroidal part and of the flange is situated on one side, e.g. above the central plane and constitutes an upper side of the covering, and the half portion of the toroidal part and flange situated on the opposite side, e.g. below the central plane, constitutes an underside of the covering.

A second, external selvedge flange may be provided which extends in the said central plane, but projects radially outwardly from the toroidal part of the protective covering.

Preferably, the toroidal endless loop, while in untensioned state, has a slightly or even considerably elongated configuration; or opposite regions of the toroidal article can be compressed to assume such configuration. The deformation of the article can be such that the portions of the internal selvedge in these opposite regions touch each other with their outer margins at which they can be permanently connected with each other, e.g. by sewing in a manner known per se, for instance as shown in the case of pairs of external selvedges 6 being connected with each other, or of pairs of internal selvedges 9, sewn together, in FIG. 6 of the European patent application Publication No. 0032749 mentioned supra.

Or these opposite regions of the toroidal article can be approached even more to each other until the portions of the internal selvedges in these opposite regions overlap each other, whereupon these internal selvedge portions are sewn together or permanently connected in some other conventional manner, whereby the article is shaped to form a strap, resembling the type shown in FIG. 7 of the European patent application No. 0032749, but with different, flatter cross sectional area.

Especially in the above-mentioned embodiment of a strap, in which the opposite regions of the internal selvedge flange overlap each other, the protective covering advantageously comprises an interwoven auxiliary warp thread run through the overlapping flange regions which thus constitute a two-layer fabric part.

In these embodiments of the article according to the invention, the cross sectional areas of the deformed regions of the article remain very different from those shown in the above-mentioned prior art publications.

In these embodiments obtained with the toroidal article according to the invention, the tendency of the hose fabric comprising the monofilament weft thread is to maintain the cross sectional area as flat as possible, due to the textile wire reinforcement constituted by the monofilament thread, the latter tends to pull the fabric toward the two selvedges, from a central fabric region therebetween, which causes the toroidal part to remain as flat as possible and to suppress fold formation.

According to a preferred feature of the invention, the hose fabric constituting the protective covering is in a woven state and is thermofixed sufficiently to have the length of the fabric shrunk by about 5 to 10%. Thereby, the attack of a load on the protective covering and the resulting danger of tearing it open can be satisfactorily avoided, even without the provision of an excessive length of the protective covering of the finished article over the length of the skein forming its score causing a certain amount of folding. It is well known how to carry out the thermofixation of fabrics made from synthetic thermoplastic resin fibers, for instance in the manufacture of safety belts for automobiles. The shrinking of the length of the protective covering which occurs by the feature of thermofixing according to the invention and which also leads to a further suppression of the tendency to form folds, can be nullified by an irreversible elongation if extremely heavy loads are applied. However, in that case, there is still available the usual reversible fabric elongation range as a further possibility of elongation, whereby the life of the protective covering is further extended.

The suppression of fold formation of the protective covering of the finished article, achieved by the features of this invention, also facilitates essentially the manufacture of a strap shaped from a flat endless-loop toroidal body comprising, according to the invention, a core consisting essentially of at least one skein, and a protective toroidal covering consisting essentially of hose fabric having a central loop axis and loosely arranged around the core, the hose fabric comprising a warp threading and a weft threading, and the weft threading comprising at least one monofilament thread extending transverse to said hose axis, which protective covering has a toroidal part and an internal annular selvedge flange extending in the said central plane and projecting radially inwardly from the toroidal part, and wherein opposite regions of the internal annular selvedge flange overlap each other, thereby forming suspension eyelets in the unconnected selvedge regions remaining at the opposite ends of the strap. The manufacture of a mat comprising a plurality of these straps extending in parallel side by side in a plane is likewise made easier, because the substantial or complete suppression of fold formation in the endless loop toroidal part facilitates sewing together of the straps in forming the mat.

The terms "upward", "downward", "upperside" and "lower side" or "underside" refer to positions of the respective parts as shown in the accompanying drawings, while "inner" and "outer" refer to the positions of parts relative to the central opening in the toroidal protective covering.

BRIEF DESCRIPTION OF THE DRAWINGS

Other features and objects of the invention will become apparent from the further description thereof having reference to the accompanying drawings in which FIG. 1 shows in perspective view a segment of the protective covering of the article of manufacture according to the invention;

FIG. 2 shows an enlarged top view of a piece of the hose fabric from which the protective covering is made, which piece is indicated by II in FIG. 1;

FIG. 7 is a perspective, fragmentary view of a further embodiment of the article of manufacture, similar to that shown in FIG. 4;

FIG. 8 is a fragmentary view, in perspective and partly in cross section, of another embodiment of a strap, shaped from the embodiment of FIG. 7;

FIG. 9 is a fragmentary view, in perspective and partly in cross section, of a third embodiment of a strap according to the invention;

FIG. 10 is a longitudinal sectional view of a mat composed of three straps of the embodiment shown in FIG. 9;

FIG. 11 is a fragmentary view, in perspective and partly in cross section, of another embodiment of a mat composed of straps, somewhat different from that of FIG. 10.

DETAILED DESCRIPTION OF THE EMBODIMENTS SHOWN IN THE DRAWINGS

Figure 3:
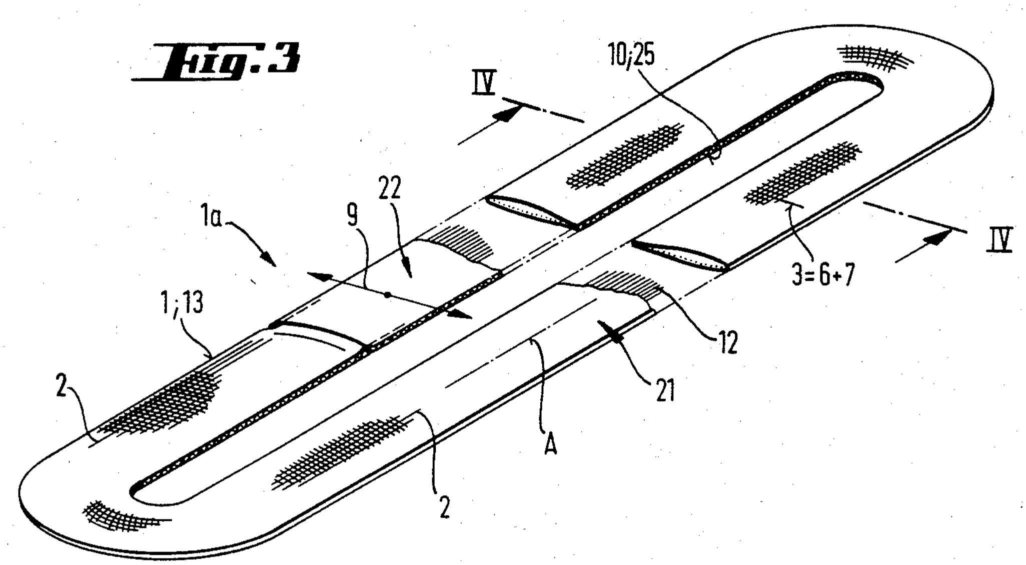
FIG. 3 shows in perspective view a first embodiment of the article of manufacture according to the invention, having a transverse zone thereof cut away.

The protective covering 1 shown in FIGS. 1 and 2 consists of a hose fabric having, schematically represented, warp threads 2 extending longitudinally in a direction indicated by the central loop axis A, and weft threads 3 extending transverse thereto generally in the direction of arrows 9. The covering 1 comprises a lower or underside fabric layer 4 and an upper fabric layer 5 with an interspace 8 therebetween in which there is located a skein 12 (omitted in FIG. 1 but shown in subsequent figures) which constitutes the supporting core of the endless loop 1*a*, i.e. the flat toroidal article of manufacture according to the invention (FIGS. 3 and 4).

In FIG. 2, a double insertion of the weft threads 3 is carried out each time with a monofilament weft thread 6 and a multifilament weft thread 7 arranged side by side. As warp threads 2 in the piece of fabric shown in FIG. 2 there are used multifilament threads. Owing to the presence of the monofilament weft thread 6, the stiffness of the hose fabric covering 1 is so reinforced in transverse direction, indicated by the arrows 9, with regard to the central tube axis A that the edges 10 and 11 of the covering 1 have the tendency to stretch the upper covering side to lie flat on the stretched underside 6 when no load is carried by the endless loop article 1*a*, whereby the unloaded article assumes a flate belt- or band-like aspect (FIG. 1).

Along the fabric edge 10 the weft thread ends are taken up and tied by means of knitted thread loops 25 (U.S. Pat. No. 4,202,381).

Figure 4:
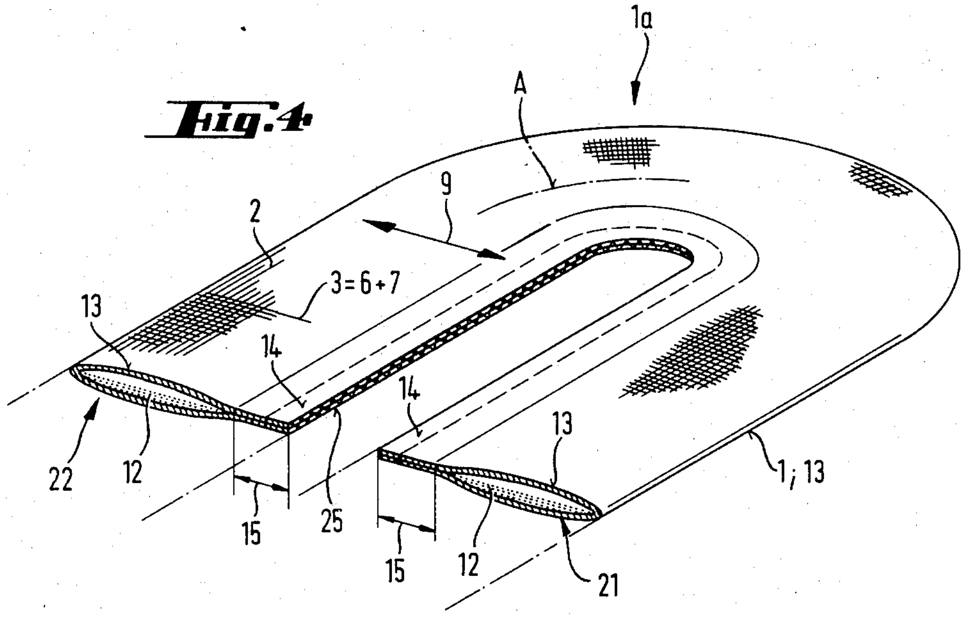
FIG. 4 is a perspective, fragmentary view, on an enlarged scale, of a different embodiment similar to that of FIG. 3, broken in a plane indicated by IV—IV in FIG. 3.

The completed endless loop article 1*a* is illustrated in a first embodiment in FIG. 3, and in a somewhat different embodiment in FIG. 4. It consists in both embodiments of a core consisting of one or several skeins 12 and the protective flat, toroidal covering 1 which encloses the core 12 with a considerable degree of looseness. In the embodiment of FIG. 4, an internal selvedge or flange 14 is woven on to the flat toroidal part 13 of the protective covering 1, which selvedge 14 projects inwardly from the sides of the covering regions facing toward each other across the central torus opening. The selvedge 14 thus extends in a central plane defined by the endless central tube axis A of the protective covering 1.

The skein of the core 12 consists of multifilament synthetic resin threads which are introduced into the endless, toroidal part 13 of the protective covering 1. The selvedge 14 can be formed in a simple manner, when weaving the hose fabric, by inserting a connecting warp thread into the two layer fabric 4,5 in a zone having a width 15 (FIG. 4), using a conventional weaving method.

Figure 5:
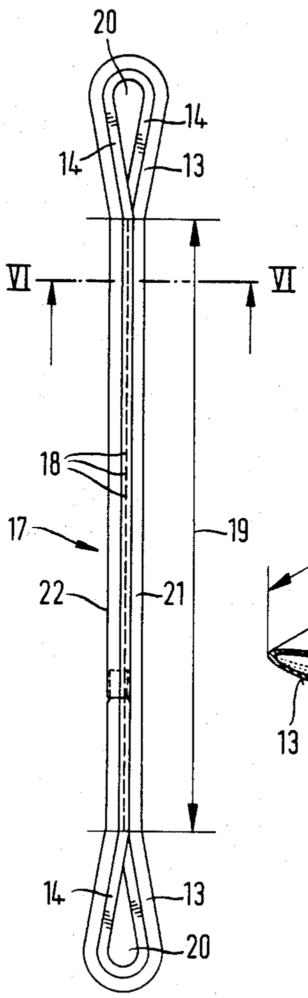
FIG. 5 is a lateral view of a first embodiment of a strap shaped from the embodiment of FIG. 4.
Figure 6:
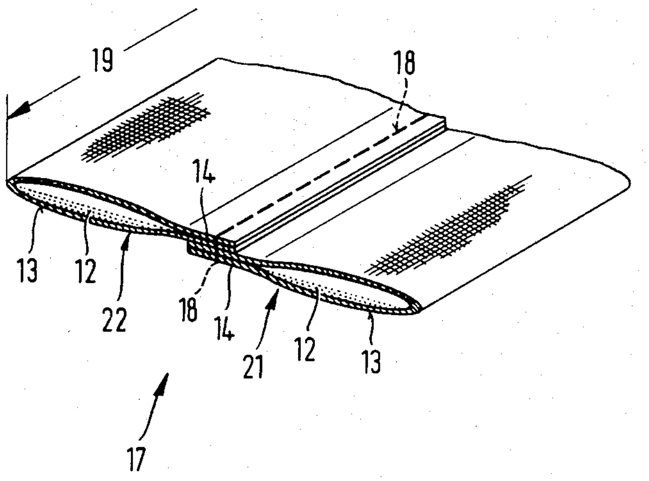
FIG. 6 is a cross sectional view of part of the strap taken in a plane indicated by VI—VI in FIG. 5.

In FIGS. 5 and 6 there is illustrated the manufacture of a strap 17 by simply sewing together opposite regions of the selvedge 14 of the embodiment of a protective covering as shown in FIG. 4. The seam of connecting stitches is indicated by reference numeral 18 in FIGS. 5 and 6. Sewing together the selvedge segments of opposite central regions 21 and 22 of the covering 1 leaves eyelets 20 open at both ends of the strap 17, only the overlapping segments of the selvedge 14 in the intermediate zone 19 being sewn together.

In the embodiment of an endless loop article 1*a* according to the invention shown in FIG. 7, the flat toroidal covering part 13 of the protective covering 1 is provided, besides an internal annular selvedge or flange 14, surrounding the central torus opening, also with an external circumferential selvedge or flange 16 which extends in the same central torus plane as the internal selvedge 14, but radially outwardly from the outside periphery of the toroidal covering part 13. The cross sectional area of the latter part is therefore of flat lenticular configuration after insertion of the core 12.

The external selvedge 16 can be woven onto the covering part 13 in the same conventional manner as the internal selvedge 14, which is reinforced by an auxiliary warp thread 26.

In the fragment of a strap 17 shown in FIG. 8 which is manufactured from the endless loop article 1*a* of FIG. 7, the latter is deformed so that opposite segments of the internal selvedge flange 14 overlap in the middle zone 19 in which the sections 21 and 22 of the protective covering 1 are brought closest to each other, whereupon the superimposed selvedge segments are sewn together by means of the seam 18.

In the embodiment shown in FIG. 9 the strap 17 is provided, on the upper side thereof, above the central plane in which the central loop axis A extends, with an abrasion-resisting cover layer 23 consisting, for instance, of a textile strip laid across the adjacent sections 21 and 22 of the protective covering 1. This upper side of the strap 17 can then serve as the working side in contact with a load carried by the strap.

In this embodiment, the sections 21 and 22 need only be brought together in a manner such that the outer edges of the opposite segments of the internal selvedge flange 14 make contact, while these segments need not overlap. Fastening these segments in position so as to maintain the strap formation is achieved by sewing the protective cover layer 23 on to the external and internal selvedge flanges 14 and 16 in the range of the said middle zone 19.

FIGS. 10 and 11 show a mat built up from three straps 17 manufactured each from an endless loop article 1*a* according to the invention as shown in FIG. 7.

The mat 24 is made by connecting indirectly the external selvedges or flanges 16 of the three straps 17 in a common transverse middle zone 19 by means of a super-imposed, transversely extending middle zone cover layer 23 while, in each of the straps, abutting internal selvedges or flanges 14 are connected indirectly by means of the same super-imposed cover layer 23, by means of seams 18 sewn through the cover layer 23 and the underlying selvedges 14 and 16. By this fixation of the straps 17 on the underside of the cover layer 23 of the mat 24, there are formed, at opposite transverse ends thereof, suspending loops or eyelets 20 which serve for suspending a load from the mat, for instance by use of a lifting bar (not shown) provided with hooks entering the eyelets (see FIG. 5 of European patent application Publication No. 0032749).

Figure 12:
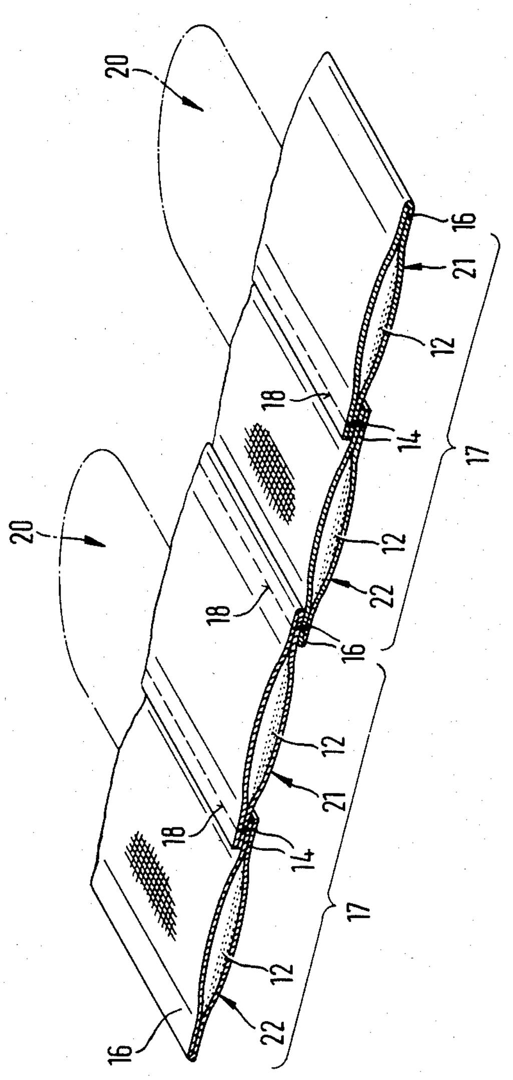
FIG. 12 is a fragmentary view, in perspective and partly in cross section, of yet another embodiment of a mat according to the invention, obtained from straps of FIG. 8.

FIG. 12 shows a fragmentary view of a similar mat 24 manufactured from three straps 17 in which case, however, the two adjacent internal selvedges 14 overlap and are sewn together by means of seams 18, and likewise two adjacent external selvedges 16 overlap and are sewn together by similar seams. Eyelets 20 are indicated by phantom lines. Every two adjacent selvedges 14, 16 overlapping and being directly connected in this manner, no cover layer 23 is required to form the mat 24, but may be provided optionally on either side as protection against wear.

What is claimed is:

1. An endless loop article of manufacture comprising a core consisting essentially of at least one skein and a protective substantially toroidal covering consisting essentially of hose fabric, having a central loop axis and loosely enclosing said core, said hose fabric comprising a warp threading and a weft threading, said weft threading comprising at least one monofilament thread extending transverse to said central loop axis.

2. The endless loop article of claim 1, wherein said weft threading comprises a monofilament and a multifilament thread arranged to run side by side.

3. The endless loop article of claim 2, wherein said monofilament thread and said multifilament thread have been entered in the fabric by double weft insertion.

4. The endless loop article of claim 1, wherein at least said monofilament thread consists of polyester fiber.

5. The endless loop article of claim 2, wherein said weft threading comprises a weft thread insertion having an end connection and a knitted thread loop at said end connection.

6. The endless loop article of claim 1, wherein said protective hose fabric covering comprises a selvedge or lateral edge and at least one auxiliary thread, and wherein said weft threads or the end portion fastenings of the inserted weft threading are tied with said auxiliary thread.

7. The endless loop article of claim 6, wherein said hose fabric comprises a knitted-in securing thread, by means of which securing thread said weft threads or the end portions of the inserted weft threading are tied.

8. The endless loop article of claim 1, wherein said central loop axis extends in a central plane, when said covering is in flat, untensioned state, and wherein said protective covering comprises an endless toroidal part and an internal annular selvedge flange extending along said central plane radially inwardly from said toroidal part, the half portion of said covering part and said flange situated on one side of said central plane constituting an upper side of said covering, and the half portion of said part and said flange situated on the opposite side of said central plane constituting an underside of said covering, said protective covering being deformable to have opposite segments of said internal annular selvedge flange contact each other.

9. The endless loop article of claim 8, wherein said internal annular flange of said protective covering comprises an interwoven connecting warp.

10. The endless loop article of claim 1, wherein said hose fabric constituting essentially said toroidal covering is in a woven state and is thermofixed sufficiently to have the length thereof reduced by about 5 to 10%.

11. The endless loop article of claim 10, wherein the annular length of the thermofixed toroidal covering, measured along said central axis thereof, corresponds substantially with the annular length of said skein-formed core.

12. A strap, shaped from an endless loop article of manufacture comprising a core consisting essentially of at least one skein, and a protective substantially toroidal covering consisting essentially of hose fabric, having a central loop axis, and loosely enclosing said core, said hose fabric comprising a warp threading and a weft threading, said weft threading comprising at least one monofilament thread extending transverse to said hose axis.

said protective covering comprising an endless toroidal part and an internal annular selvedge flange extending along said central plane radially inwardly from said toroidal part, wherein said protective covering together with the core therein is so deformed that opposite segments of said internal annular flange in a middle zone of said covering are vicinal to each other, thereby forming suspension eyelets in the unconnected regions remaining at the opposite ends of said strap, said strap further comprising connecting means for firmly connecting said opposite flange segments with each other in said middle zone.

13. The strap of claim 12, wherein said selvedge flange is integral with said toroidal part.

14. The strap of claim 12, wherein said selvedge flange and said toroidal part constitute a single piece of woven fabric.

15. The strap of claim 12, wherein said mutually connected opposite segments of said selvedge flange overlap each other and said connecting means comprise and auxiliary thread interwoven with said overlapping flange segments.

16. The strap of claim 12, wherein said connecting means comprise a protective layer against abrasion covering said middle zone of said strap in which said mutually connected selvedge flange segments extend.

17. The strap of claim 16, wherein said protective layer comprises a strip being sewn on to at least one of said mutually connected opposite selvedge flange segments.

18. The strap of claim 12, wherein said protective covering further comprises an external circumferential selvedge flange extending in said central plane radially outwardly from said toroidal part.

19. A mat comprising a plurality of straps, each of said straps being shaped from an endless loop article of manufacture, comprising a core consisting essentially of at least one skein, and a protective substantially toroidal covering essentially of hose fabric, having a central loop axis and loosely enclosing said core, said hose fabric comprising a warp threading and a weft threading, said weft threading comprising at least one monofilament thread extending transverse to said central loop axis, said central loop axis extending in a central plane when said protective covering is in flat, untensioned state, said protective covering comprising an endless toroidal part and an internal annular selvedge flange extending in said central plane radially inwardly from said toroidal part, opposite segments of said internal annular selvedge flange in a middle zone of said protective covering being connected with each other, thereby forming suspension eyelets in the unconnected regions remaining at the opposite ends of each strap, and an external circumferential selvedge flange extending in said central plane radially outwardly from said toroidal body of each toroidal part, said straps being laid side by side with those middle zones of said straps in which said opposite segments of said internal selvedge flanges extend, being positioned in parallel, in said central plane, said mat further comprising connecting means for connecting said segments of said selvedge flanges in said middle zone with each other.

20. The mat of claim 19, wherein said internal selvedge flanges of adjacent straps contacting one another in a transverse zone constituted by said middle zones are sewn together.

21. The mat of claim 19, wherein said connecting means comprise a web of protective layer laid on top of at least one face of said mat in said transverse zone, and seams of threads by means of which the underlying segments of adjacent ones of said internal and external selvedge flanges in said transverse zone of said web are sewn on to said protective layer.

22. The endless loop article of claim 2, wherein at least said monofilament thread consists of polyester fiber.

23. The endless loop article of claim 3, wherein at least said monofilament thread consists of polyester fiber.

* * * * *